United States Patent [19]

Buehlmann

[11] Patent Number: 5,337,964
[45] Date of Patent: Aug. 16, 1994

[54] METHOD AND PLANT FOR RECOVERING SECONDARY RAW MATERIALS FROM GARBAGE

[75] Inventor: Thomas Buehlmann, Schachen, Switzerland

[73] Assignee: Ikotek Informatik, Kommunikation und Fertigungstechnik AG, Furstentum, Liechtenstein

[21] Appl. No.: 41,836

[22] Filed: Apr. 1, 1993

[30] Foreign Application Priority Data

Dec. 11, 1992 [DE] Fed. Rep. of Germany ....... 4241754

[51] Int. Cl.$^5$ .............................................. B02C 23/18
[52] U.S. Cl. .......................................... 241/17; 241/23; 241/24; 241/101.7; 241/DIG. 38
[58] Field of Search ................. 241/17, 18, 23, 24, 241/29, 101.7, DIG. 38

[56] References Cited

U.S. PATENT DOCUMENTS

| | | | |
|---|---|---|---|
| 2,400,382 | 5/1946 | Arnold | 241/17 |
| 3,682,396 | 8/1972 | Whitney et al. | 241/55 X |
| 3,790,091 | 2/1974 | Law et al. | 241/27 X |
| 3,985,086 | 10/1976 | De Tola | 241/DIG. 38 X |
| 4,037,795 | 7/1977 | Fyfe | 241/DIG. 38 X |
| 4,619,409 | 10/1986 | Harper et al. | 241/606 X |
| 4,815,668 | 3/1989 | Frei | 241/29 X |
| 5,186,397 | 2/1993 | Orlando | 241/101.7 X |

FOREIGN PATENT DOCUMENTS 9014890 12/1990 PCT Int'l Appl. ......... 241/DIG. 38

Primary Examiner—Mark Rosenbaum
Assistant Examiner—Frances Han
Attorney, Agent, or Firm—Tarolli, Sundheim & Covell

[57] ABSTRACT

The invention relates to a method for recovering secondary raw materials from garbage consisting of a non-uniform mixture of useful materials gone out of use. Said method comprises the following steps: crushing the solid components of said mixture; separating the obtained crushed mixture into fractions of the same species; and subjecting said fractions to a dehumidification process. Said dehumidification process extends continuously throughout all stages of the whole recovering process. The invention also relates to a plant for carrying through said method, said plant comprising means for crushing the solid components of said mixture; separating the obtained crushed mixture into fractions of the same species; subjecting said fractions to a dehumidification process; and transporting the material to be processed form one station to the next one. All means for processing and transporting said mixture of useful materials through the whole recovering plant are located in a outwardly hermetically closed chamber, said plant can be stationary or mobile, in particular mounted on a railroad train. Said method and plant provide waste air which does not contain any pollutants.

13 Claims, 2 Drawing Sheets

METHOD AND PLANT FOR RECOVERING SECONDARY RAW MATERIALS FROM GARBAGE

TECHNICAL FIELD

This invention relates to a method for recovering secondary raw materials from garbage, i.e. from a nonuniform mixture of useful materials gone out of use, wherein the solid components of the mixture of useful materials are crushed and separated into fractions of the same species, and subjected to a dehumidification process.

BACKGROUND OF THE INVENTION

"Useful materials" is the generally accepted expression for those materials contained in garbage of any kind and any provenance which, on principle, can be reused.

The general trend is to exploit the garbage as perfectly as possible and to recover its useful materials as completely possible, thus obtaining secondary raw materials which can be recycled into the manufacturing process. Therefore, this will widely avoid the usual annihilation, or unused deposition, of the garbage and of the useful materials contained therein, as well as the environmental pollution connected to such behavior.

Industrially used recovering plants are to guarantee that the recovered fractions of useful materials are of the same species, and that the legal pollutant limits are met. A condition for this is that the recovering process is carried out in a plant which neatly separates the components, and does not allow any re-distribution between or enrichment of pollutant components in the fractions of the useful materials.

Thereby, an essential problem is controlling the whereabouts of the pollutants during the recovering process. For example, heavy metal compounds may appear as pollutants if they evaporate, or if removed by gasifying out of their original coherence with other inorganic compounds. And they may combine with the organic compounds present in the same mixture, wherefrom they can impeccably removed only with great difficulty. When such recovered organic working materials are reused, heavy metal compounds combined with them may get into the surroundings, where they have bad consequences, for example if they get into the food chain by using a secondary raw material as a fertilizer.

The danger of a splitting off possible pollutants by gasifying is particularly important if during a dehumidification process working temperatures of well above 100° C. are used for dehumidification or for drying, as is often the case. As is generally known, some poisonous heavy metal compounds, in particular cadmium and mercury compounds, partially start evaporating already at about 115° C.

Some of the known recovering plants for example those according to Swiss Patent No. 650,172, comprise a separate drying station for dehumidifying the useful materials, all fractions of the useful materials being jointly treated with dry air before their final separation and optional further crushing. Thereby, in most cases, high air temperatures are used in order to secure that the residence time of the material in the drying station be as short as possible. Moreover, this also effects a sterilization of the material. However, in said dehumidification process, the material is so highly heated that a re-distribution of the pollutants can hardly be avoided in practice.

OBJECTS OF THE INVENTION

It is a primary object of the present invention is to provide an improved method and an improved plant which avoid the above-mentioned disadvantages of the prior art.

It is a further object of the invention to provide an improved method and an improved plant of the kind described above wherein the dehumidification process is effected in such a manner that any possible pollutants are not released, but are left in their original state.

SUMMARY OF THE INVENTION

To meet these and other objects, the present invention provides a method and a plant wherein the dehumidification process is continuously extended to all sectors of the recovering process. By extending said dehumidification process to the whole recovering process, the dehumidification zone is enormously enlarged. Thus, the duration of action of the drying air on the material is considerably prolonged, as compared with that of a separate drying station. As a result of this, the dehumidification process can be carried through at relatively low temperatures of the drying air, and the re-distribution of possible pollutants is avoided. Moreover, an additional residence time of the material in a separate drying station is avoided. As a result of this, the total processing time of the material through the whole recovering; process, inclusive of the dehumidification process, is reduced by up to 25 percent.

As a whole, the recovering process, as it is to be understood here, comprises all those processing steps which lead to fractions of useful materials which are of the same species. In their final state, each of said various fractions is of a size which is suitable for the previous separation thereof, and has a humidity content which is suitable for the further processing thereof. An optional further processing; of said fractions, for example a further crushing, the addition of loading materials, or the packing of the obtained secondary raw materials, is not part of the recovering process as defined above.

Preferably, the whole recovering process takes place in a isolated atmosphere, having; an air circulation giving rise to said dehumidification process. Preferably, said isolated atmosphere is kept at a partial vacuum. As experience shows, said dehumidification of the material also causes the removal of odorizing and/or biologically critical bacteria. Such bacteria are outwardly withdrawn by the circulating air current. The circulating air can be re-conditioned, i.e dehumidified and purified, in a separate processing step which takes place outside said isolated atmosphere. Any warming up of the air occurring during; said re-conditioning is unproblematic, since the air withdrawn from the isolated atmosphere, as a prerequisite cited above, does not contain any heavy metal compounds which could evaporate and evade from further control.

In said particular embodiment, the method according to the invention shows the further advantage that, simultaneously with the dehumidification process, a deodoration and optionally a sterilizing of the material can be achieved, without subjecting the material as such to a temperature which is excessive with respect to the forming of heavy metal compounds.

An effective and easily controllable dehumidification of the material can be effected by cooling the mixture of useful materials contained in the isolated atmosphere at the beginning of the recovering process, and heating said mixture at the end of said recovering process. Preferably, the temperature in the isolated atmosphere is a few centigrades, e.g. 5° C., above the freezing point of water at the beginning of the recovering process, and is at highest 100° C. at the end of said recovering process. A low starting temperature guarantees that the material to be treated is not unduely heated during the recovering process. In particular, in this manner an overheating of the material under the influence of the waste heat of the machines participating in the recovering process is avoided. On the other hand, by the increased final temperature the forming of condensation water, when the material leaves the isolated atmosphere and enters into the free atmosphere, is avoided.

The present invention also refers to a plant for carrying through the method according to the invention, wherein all mechanical means and apparatuses for processing and transporting the mixture of useful materials through the recovering process are enclosed in a chamber which is outwardly hermetically closed.

Said mechanical means and apparatuses for processing and transporting said mixture comprise:

crushing machines (such as shredders, rotating shears, and mills), on the one hand; and separating devices (such as sieves, cyclones and other separators), on the other hand.

Preferred transporting means for the material comprise:

conveyor bands (for the heavy materials); and conduits (for light materials and suspended matter).

Said machines and devices are selected depending on the composition of the mixtures of useful materials to be treated. The are known per se, and are not further explained and illustrated here.

In a preferred embodiment of the plant according to the present invention, the outwardly hermetically closed chamber is subdivided into a plurality of sections which are interconnected by locks, in particular by rotary locks. This allows to individually block off the chamber sections in case of defects, and thus to locate the harmful effects thereof. A further advantage of said chamber division is that the dehumidification process can be controlled sectionwise, In particular, the air temperature can be individually adjusted in each chamber section to the humidity content of the material to be treated there. In this manner, it is easier to control the heating pattern along the whole dehumidification zone, as well. In particular, it allows to keep the air temperature relatively low at be beginning of the recovering process, and to increase it at the desired degree in the final phase of the recovering process.

In an particularly preferred embodiment of the plant according to the present invention, the outwardly hermetically closed chamber is a tunnel. Said tunnel preferably is a steel construction, and has a volume as small as possible, in order to limit the rate of air necessary in the dehumidification process.

A plant of the kind described above is not compulsorily stationary, but can be mobile. For example, it can be mounted on a track comprising a plurality of wagons, e.g. a railroad train comprising a plurality of railroad cars. Thereby, each truck may comprise one or several tunnel sections. Moreover, each truck may comprise at its one end a lock, and at its other end a movable connection for separably connecting it to the next following tunnel section. Such mobile processing plants are practical when temporarily an excessive quantity of garbage is to be processed.

DESCRIPTION OF THE PREFERRED EMBODIMENT

Now, a known recovering process and a preferred embodiment of the present invention will be described with reference to the drawings.

Figure 1:
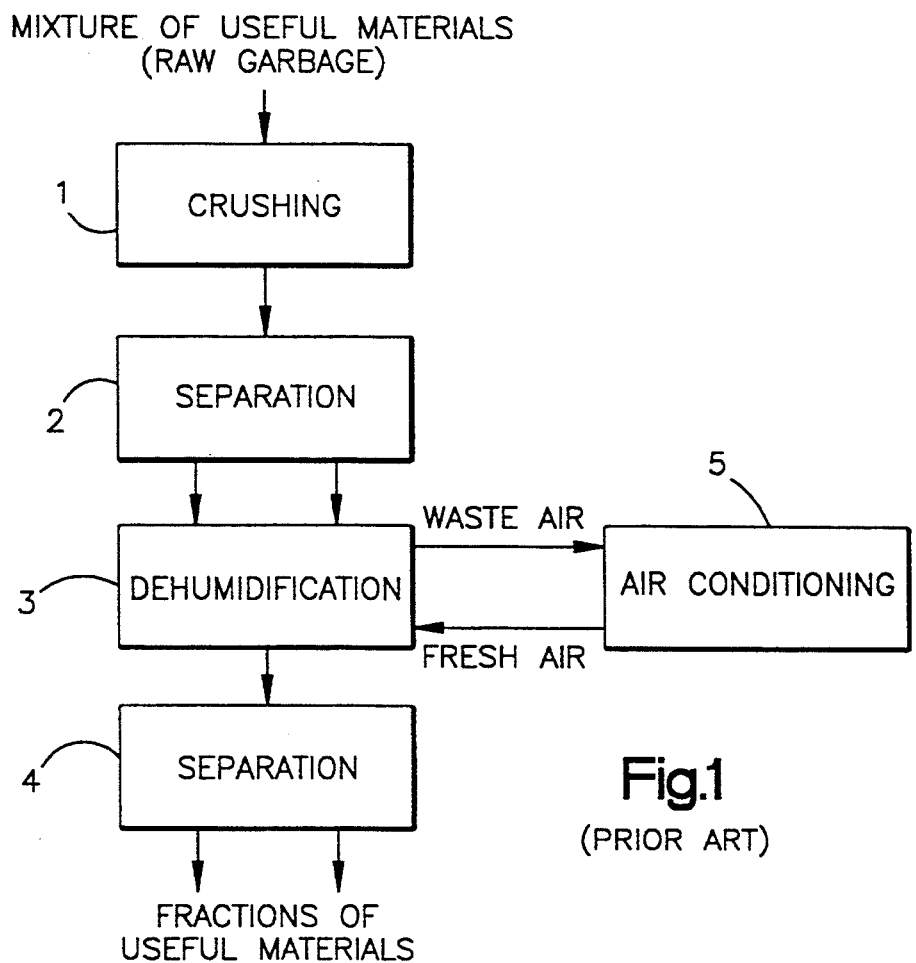
FIG. 1 is the principle diagram of a known recovering process.

In the known recovering process shown in FIG. 1, the mixture of useful materials, i.e. the raw garbage, is crushed in a first treatment step 1, and separated in a second treatment step 2 into fractions of useful materials which are of the same species. Said fractions are jointly dehumidified in a third treatment step 3. Then, they are again separated in a fourth treatment step 4. The re-conditioning; of the air used in said third treatment step 3 is effected in a separate treatment step 5.

Figure 2:
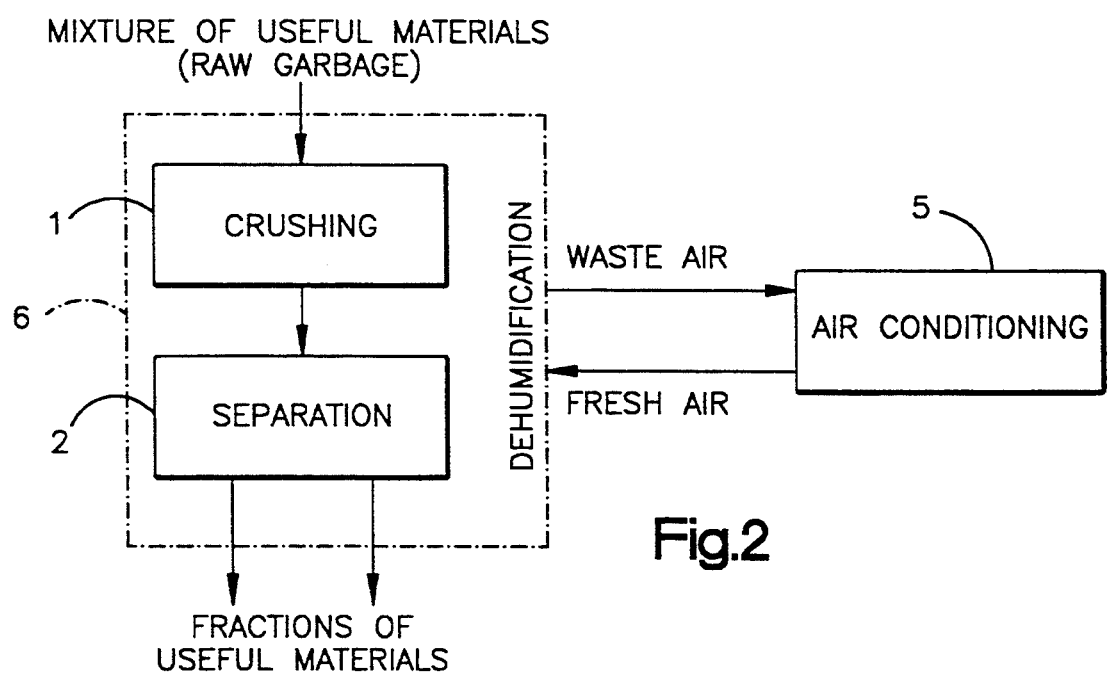
FIG. 2 is the principle diagram of the recovering process according to the present invention.

In contrast to this known technology, in the recovering process according to the present invention, shown in FIG. 2, the dehumidification process continuously extends throughout all sections of the recovering process. Thus it comprises the treatment step 1 and 2, in which the mixture of useful materials is crushed and separated into fractions. Treatment step 3 of FIG. 1, concentrating on the dehumidification of the material, is dropped. For this purpose, the whole recovering process, comprising in the present example the two treatment steps 1 and 2, are effected in an isolated atmosphere, generally marked "6", by means of circulating air affecting the dehumidification of the material. The re-conditioning of the circulating air is again effected in a separate treatment step 5. In practice, said treatment steps 1 and 2 are generally not completely separated from each other, as described above, but crushing steps and separating steps alternate.

Figure 3:
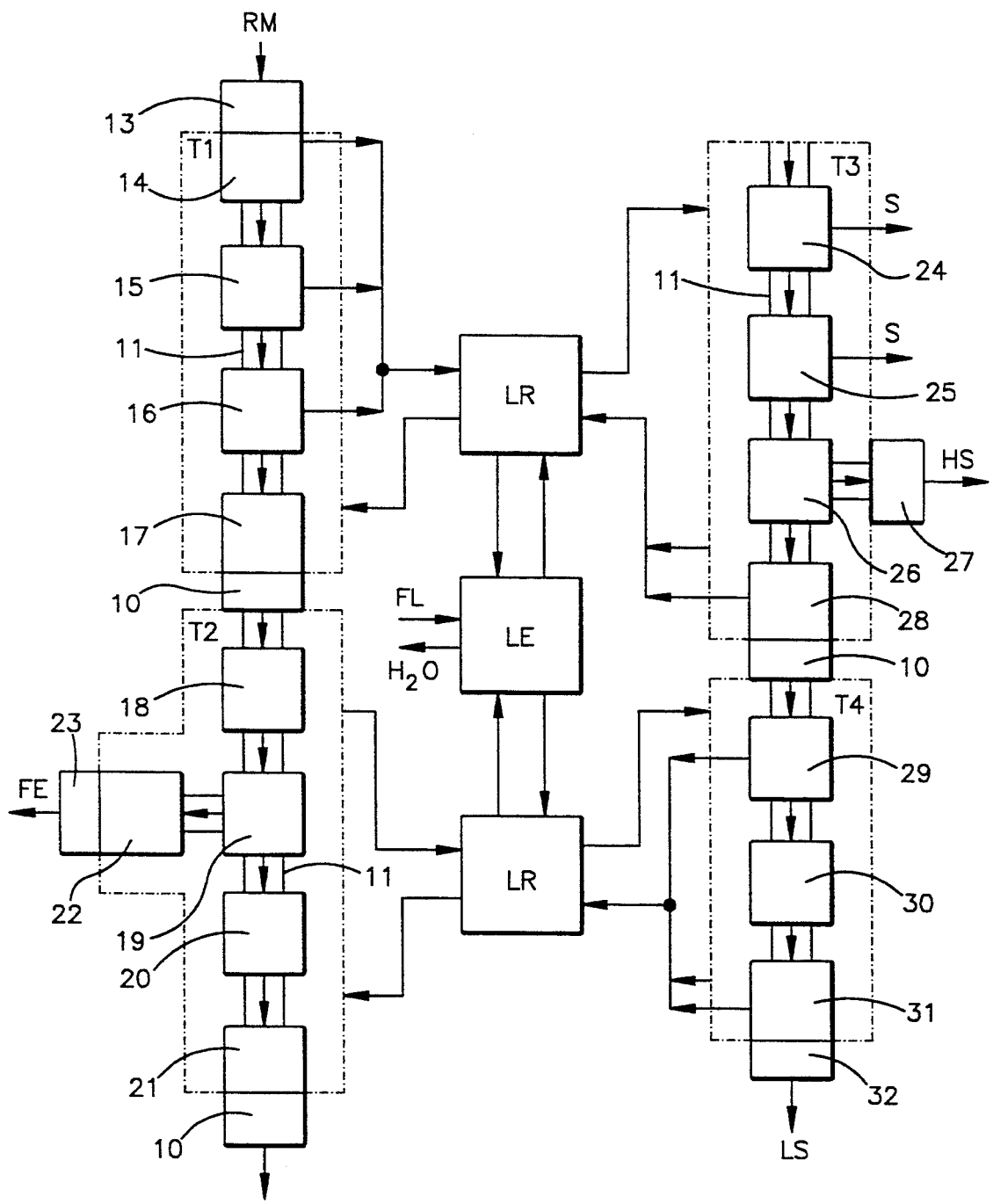
FIG. 3 is the construction diagram of a processing plant according to the present invention.

In the preparation plant shown in FIG. 3, the machines for the processing and the transport of the mixture of useful materials are located in a outwardly hermetically closed chamber, which in this example is a tunnel. This tunnel is subdivided into four tunnel sections T1, T2, T3, T4. They are arranged in series and interconnected by locks, in particular by rotary locks. Each tunnel section comprises a plurality of processing stations. The conveying means for transporting the material farther to the next processing station is, in the first three tunnel sections T1, T2 and T3, where the material still is a mixture of heavy and light materials, a belt conveyor 11. The light material remaining in the last tunnel section T4 mainly is conveyed pneumaticly.

The crushing and separating; stations explained hereafter as to their kind and combinations are described by way of example only. In practice, some of said stations may be present several times, or supplemental stations may be necessary, or some stations may be omitted.

A receiving station 14 is located at the beginning of the tunnel section T1. Said receiving station 14 serves to receive the raw garbage and to weigh it. Thereafter, the raw garbage is passed to a garbage bin 15, from there to a shredder 16, and finally to a visual check conveyor 17. There, a continuous check for dangerous material, or for material which is unsuitable for further processing for other reasons, is effected by means of sensors, in order to localize and eliminate such undesired materials.

In the second tunnel section T2, the material passes through a rotating shears 18, a magnetic separator 19, a further rotating shears 20, and a flexmill 21. The stations 16, 18, 20 and 21 gradually crush the passing material to the maximum desired particle size, e.g. to 20 mm. The ferrous metals (FE) separated by the magnetic separator 19 are removed from the tunnel section T2 through a lock 23 by means of a scrap metal conveyor 22.

Located at the beginning of the tunnel section T3 is a sieve station 24 which separates sand and dust (S) by means of one or several filters and fans. A cyclone separator 25 serves the same purpose.

In the station 26, which is a so-called hard material separator, the material is subdivided into hard materials (HS), which predominantly are heavy inorganic compounds, and light materials (LS), which predominantly are organic flocculent materials. The hard materials (HS) are removed from the processing plant in the area of tunnel section T3 by a lock 27. The light materials (LS) are finally passed trough a cyclone separator 28 into the last tunnel section T4. Said last tunnel section T4 comprises a cyclone separator 29, a hammer mill 30, and a further cyclone separator 31. The processed light materials (LS) are removed from the processing plant through a lock 32 closing said tunnel section T4 at its end.

The waste air from the tunnel sections T1, T2, T3 and T4, and additionally the direct waste air from the stations 14, 15, 16, 28, 29 and 31, are passed to one of the two air cleaners (LR). Said air cleaners (LR) cooperate with a air dehumidifier (LE). The purified and dehumidified air is again passed to the individual tunnel sections T1, T2, T3 and T4. Additionally, fresh air (FL) is passed through the air dehumidifier (LE) into the route of the circulating air dehumidifying the material in said tunnel sections T1, T2, T3 and T4. The big quantities of water separated in the air dehumidifier (LE) may be reused for suitable proposes.

What is claimed is:

1. A method of recovering secondary raw materials for garbage consisting of a non-uniform mixture of useful materials gone out of use, said method comprising the steps of:
   (1) crushing the solid components of said non-uniform mixture;
   (2) separating the obtained crushed mixture into fractions wherein each of said fractions is of uniform composition; and
   (3) subjecting said fractions to a dehumidification process wherein (i) said dehumidification process extends continuously throughout all steps of said recovering method, (ii) all steps of said recovering method are effected in an isolated atmosphere which is separated from the surrounding atmosphere, by circulating the air effecting said dehumidification process, and (iii) the temperature of said isolated atmosphere is at highest 100° C. at the end of the last step of said recovering method.

2. The method according to claim 1, wherein said isolated atmosphere is kept at a partial vacuum.

3. The method according to claim 1, wherein part of said circulating air is taken from said isolated atmosphere, is dehumidified and purified, and thereafter is reintroduced into said isolated atmosphere as clean air.

4. The method according to claim 1, wherein the mixture of useful materials contained in the isolated atmosphere is cooled at the beginning of said recovering process, and is heated at the end of said recovering process.

5. The method of claim 1, wherein the temperature of said isolated atmosphere is about 5° C. above the freezing point of water at the beginning of said recovering process.

6. A plant for recovering secondary raw materials from garbage consisting of a non-uniform mixture of useful materials gone out of use, said plant comprising:
   means for crushing the solid components of said non-uniform mixture;
   means for separating the obtained mixtures into fractions, each of said fractions being of uniform composition;
   means for subjecting said fractions to a dehumidification process;
   means for circulating the air effecting said dehumidification; and
   means for transporting the material to be processed from one station to the next one;
   all means for processing and transporting said non-uniform mixture of useful materials through said recovering plant being located in an outwardly hermetically closed chamber.

7. The plant according to claim 6, wherein said outwardly hermetically closed chamber is subdivided into a plurality of sections, said sections being interconnected by locks.

8. The plant according to claim 7, wherein said locks are rotary locks.

9. The plant according to claim 6, wherein said closed chamber is a tunnel.

10. The plant according to claim 6, wherein said plant is mobile.

11. The plant according to claim 10, wherein said plant is mounted on a railroad train comprising a plurality of railroad cars.

12. The plant according to claim 11 wherein each of said railroad cars comprises at least one tunnel section.

13. The plant according to claim 12 wherein each of said railroad cars comprises at its one end a lock, and at its other end a movable connection for separably connecting it to the tunnel section of the next one of said railroad cars.

* * * * *